United States Patent [19]
Fields et al.

[11] Patent Number: 4,758,974
[45] Date of Patent: Jul. 19, 1988

[54] MOST SIGNIFICANT DIGIT LOCATION

[75] Inventors: Evelyn M. Fields, Marlboro Township, Monmouth County, N.J.; Ronald L. Freyman, Bethlehem, Pa.; Yehuda Rotblum, East Brunswick, N.J.

[73] Assignee: American Telephone and Telegraph Company, AT&T Bell Laboratories, Murray Hill, N.J.

[21] Appl. No.: 695,907

[22] Filed: Jan. 29, 1985

[51] Int. Cl.⁴ .......................... G06F 7/38; G05F 7/50
[52] U.S. Cl. .................................... 364/748; 364/786; 364/736
[58] Field of Search ............... 364/748, 786, 787, 788, 364/736, 754, 761, 768, 715, 716

[56] References Cited

U.S. PATENT DOCUMENTS

| 3,831,012 | 8/1974 | Tate et al. | 364/748 |
| 4,152,775 | 5/1979 | Schwartz | 364/786 |
| 4,229,801 | 10/1980 | Whipple | 364/748 |
| 4,357,675 | 11/1982 | Freyman | 364/786 |
| 4,511,990 | 4/1985 | Hagiwara et al. | 364/748 |
| 4,534,010 | 8/1985 | Kobayashi et al. | 364/748 |
| 4,562,553 | 12/1985 | Mattedi et al. | 364/748 |
| 4,563,751 | 1/1986 | Barker | 364/786 |
| 4,592,006 | 5/1986 | Hagiwara et al. | 364/748 |

FOREIGN PATENT DOCUMENTS 0099542  6/1984  Japan ................................. 364/748

Primary Examiner—Gary V. Harkcom
Assistant Examiner—Long Thanh Nguyen
Attorney, Agent, or Firm—James H. Fox

[57] ABSTRACT

After performing a floating point addition, it is desired to normalize the sum; that is, shift the most significant digit of the mantissa into the left-most digit location, and adjust the exponent accordingly. Prior art techniques required performing the addition before calculating the number of shifts required. The present technique determines an approximate shift from the addends during addition, resulting in a significant time saving.

7 Claims, 4 Drawing Sheets

FIG. 3 COMBINED, ADDER CELL (TOP) AND FLSD CELL (BOTTOM)

CONTROL FOR POST-SHIFT

POST-SHIFT

MOST SIGNIFICANT DIGIT LOCATION

BACKGROUND OF THE INVENTION

1. Field of the Invention

The present invention relates to a technique for reducing the time required to determine the most significant digit of the result produced by combining two or more operands together.

2. Description of the Prior Art

In the addition of floating point numbers, each number to be added (addend) is represented by a mantissa and an exponent. To perform the addition, the mantissa of one of the addends is shifted until the exponents match. Normally, the addend having the larger exponent remains unshifted, whereas the addend having the smaller exponent has its mantissa shifted a given number of places to the right (that is, towards the least significant digit), while increasing its exponent a comparable amount until it equals the exponent of the larger addend. Then, the two mantissas are added to obtain a sum. If more than two addends are to be added, all but the largest addend can be thus adjusted prior to the addition. If the mantissas that are added together are of the same sign, then the sum may be so large that it has to be shifted to the right to normalize it. If the mantissas are of opposite sign, then cancellation may occur such that the sum needs to be shifted to the left to normalize it. Normalization is achieved when the most significant digit of the sum occupies the most significant digit position of the result.

In many types of adder circuits, for example, integrated circuits employing microprocessing circuitry, it is desired that the most significant digit of the sum occupy the most significant digit position in a register or other circuit embodiment. To obtain this result in the prior art, a shifter is typically employed to shift the sum output of the adder circuitry to the left or right, until the most significant digit occupies the most significant digit position. The exponent of the sum is adjusted accordingly, being increased one digit for each position that the sum is shifted towards the left, or decreased one digit for each position that the sum is shifted to the right. Thus, the prior art technique requires that the sum be available before the normalization is initiated.

It is desirable to speed up the time required to obtain the sum from an adder circuit and normalize it as described. In particular, most computational circuitry is clocked to operate on machine cycles, wherein one or more operations are performed during a given cycle. It is desirable to maximize the amount of useful computation that can be obtained in each machine cycle, and thereby reduce the total time required to achieve a given result. For this purpose, "parallelism" is often utilized for performing more than one type of operation simultaneously. Usually, operations that are considered for parallel implementation are those that are independent; that is, the result of one does not depend upon the result of another.

SUMMARY OF THE INVENTION

We have invented an improved technique for determining the most significant digit of the sum of two or more addends, which allows a reduction of the time required to normalize the sum. In this technique means are provided to determine the at least approximate location of the most significant digit of the sum by examining the addends during the time that the addends are being added to produce the sum. In one embodiment, an approximate location of the most significant digit of the sum is first determined. If a carry indication is present upon the completion of the addition, the approximate location is corrected. In another embodiment, the most significant digit of the sum is determined exactly during the adding. In another aspect of the invention, the location of the most significant digit is determined according to a formula that accounts for both positive and negative addends. The technique can also be used to determine the most significant digit of the difference obtained by subtracting two numbers. The technique is typically implemented in an integrated circuit.

DETAILED DESCRIPTION

Figure 1:
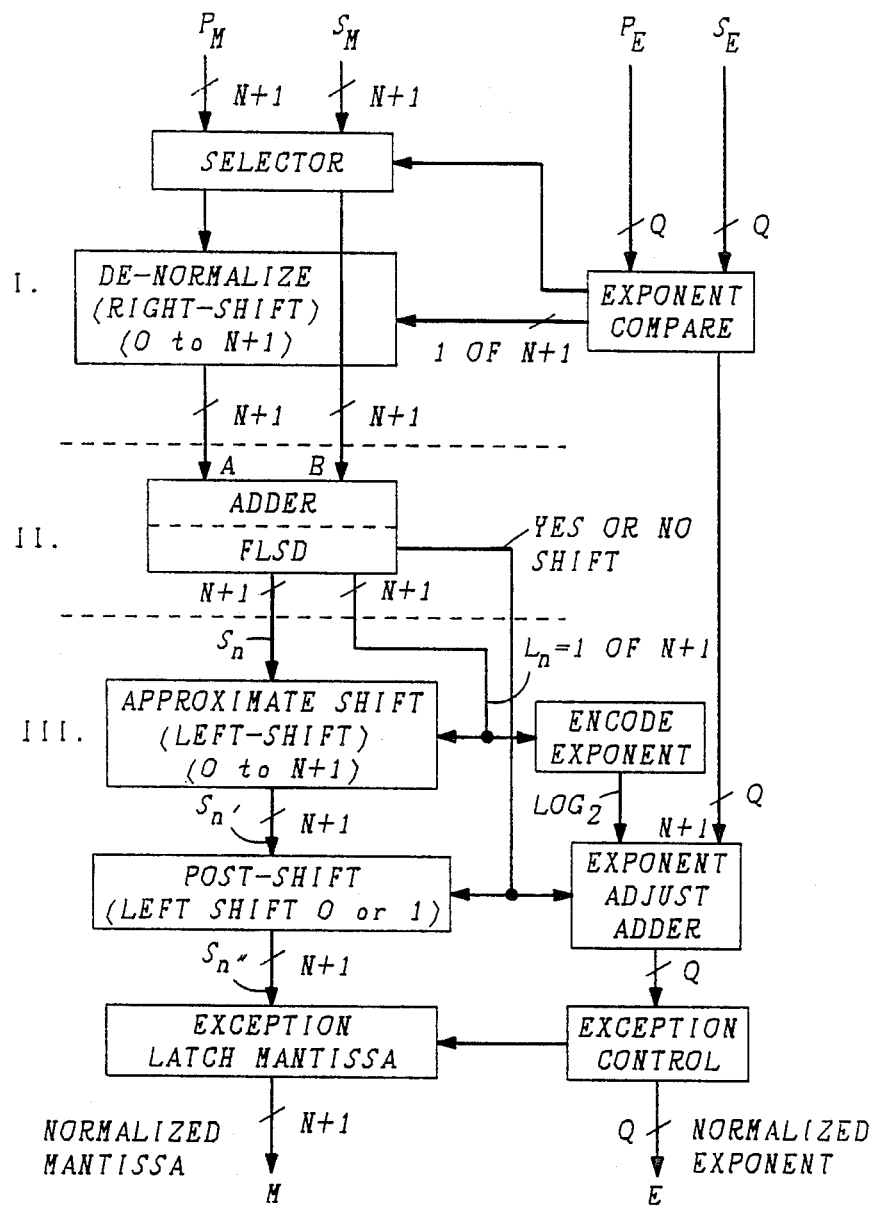
FIG. 1 illustrates a typical floating point adder block diagram utilizing the present technique.

The following detailed description relates to circuitry for reducing the time required to add two (or more) addends and normalize the sum. The digits of the addends and sum are normally represented in a base 2 number system; that is, they are binary digits (i.e., "bits"). However, representation in other number systems is possible. The present invention can be understood by referring to a typical implementation in a floating point adder; see FIG. 1. This adder is divided into three major sub-blocks, which are derived from the operations they perform. These operations are:

I. De-Normalization—This operation compares the exponent of the addends and shifts the mantissa associated with the smaller exponent accordingly.

II. Mantissa addition and FLSD—This is the adder circuitry, plus circuitry for determining the location of the most significant digit.

III. Normalization—This normalizes the sum obtained from the addition in two stages: an approximate shift, and a post-shift.

As illustrated, two floating point numbers are to be added, and the number of bits involved in each operation is indicated. The mantissas each have $N+1$ bits (0 to N), and the exponents each have Q bits. For a typical circuit, the addends are 43 bits long each, with the mantissas being 35 bits ($N=34$) and the exponents 8 bits ($Q=8$) long each. As explained further below, the circuit also provides for finding the most significant bit in 2's complement arithmetic, which can provide for convenient subtraction by the use of adder circuitry. The floating point addends may arrive to the adder from different sources. The sources can be internal to an integrated circuit chip, with the addends being obtained from a register or other source, or they may be externally obtained, such as from a memory or a product obtained from a multiplier. The addends (P, S) may arrive in normalized form, each comprising a normalized mantissa ($P_M$, $S_M$, respectively) and an exponent ($P_E$, $S_E$, respectively). However, the present technique can be utilized if either or both addends arrive at the adder un-normalized.

The first operation in the circuit shown in FIG. 1 is de-normalization, which sets the exponents of the addends to be equal so that the mantissa portions can be added. To accomplish this, the exponents of the addends are compared to each other ("exponent compare"), and the larger exponent is selected to be the exponent for the sum. The "selector" circuit routes the mantissa of the addend having the larger exponent directly to the adder, and routes the mantissa of the addend having the smaller exponent to the "de-normalize" circuit. The mantissa of the addend having the smaller exponent is then arithmetically right-shifted (i.e., toward the least significant digit location) by the difference obtained from the comparison of the exponents. The sign bit is shifted into the most significant bit locations that are vacated by the right shift. For example, "0"s are shifted in from the left for a positive number, and "1"s for a negative number in 2's complement representation. These de-normalized mantissas are illustrated as "B" and "A" respectively, but may be reversed in order without changing the discussion below.

In the adder portion of the circuit, the two mantissas (each 35 bits long as shown) are added. The location of the most significant digit is also determined at least approximately during the addition time. The technique for locating the most significant digit of the sum is referred to herein as "find left-most significant digit", or "FLSD". In one embodiment of the present invention, the normalization of the sum is accomplished by generating the sum and finding the approximate location of the left-most significant digit substantially simultaneously; i.e., in parallel. This is because the time-consuming operation in a typical adder is propagating the carry, and the time-consuming operation in the FLSD is propagating the pointer, discussed below. Hence, by accomplishing these operations in parallel, a significant time saving is achieved. Then, if necessary, the sum is shifted one place to the left in a "post-shift" operation. This corrects for the position one digit error in the MSB location that occurs if the MSB is one place to the left of the approximate location, which is dependent on the carry condition into the $i^{th}$ location.

The first task of the FLSD circuit is to locate the approximate position of the most significant digit of a sum by using the primitive inputs, addends "A" and "B", to the adder. The individual digits of these addends are referred to as $A_n$, $B_n$, respectively, where $0 \leq n \leq N$, where $N+1$ is the number of bits in the addends (assumed the same for A and B for convenience). The convention herein denotes $A_0$, $B_0$ as the least significant bit positions, and $A_N$, $B_N$ as the most significant bit positions.

An example of generating the conditions for the FLSD approximation for positive addends will illustrate the present technique, and ease the transition into the more complicated case of 2's complement numbers, which will be presented later. This example also introduces the terms that are used in the FLSD function. The most significant bit (MSB) of the sum is indicated by an asterisk (*).

TABLE 1

| "A" and "B" are positive: | | | | | | | | |
|---|---|---|---|---|---|---|---|---|
| bit location | N | | i+1 | i | | | | 0 |
| A | 0 | 0 | 0 | 0 | 1 | 0 | 1 | 1 |
| B | 0 | 0 | 0 | 1 | 0 | 0 | 0 | 0 |
| SUM | 0 | 0 | 0 | 1 | 1 | 0 | 1 | 1 |
| MSB | | | | * | | | | |

TABLE 1-continued

| "A" and "B" are positive: | | | | | | | | |
|---|---|---|---|---|---|---|---|---|
| $F_n$ | 0 | 0 | 0 | 0 | 1 | 1 | 1 | 1 |
| $U_n$ | 1 | 1 | 1 | 0 | X | X | X | X |

Figure 2:
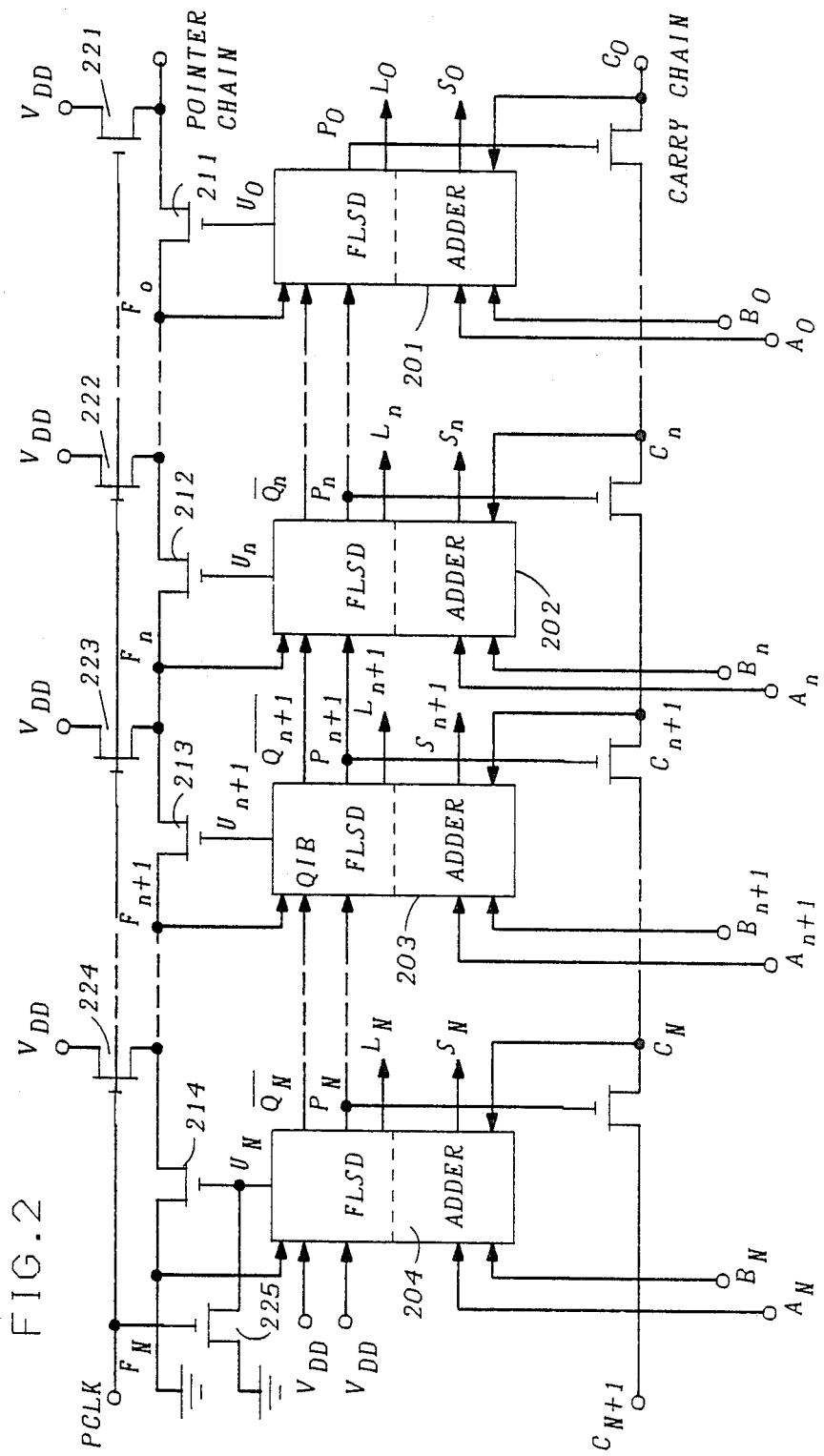
FIG. 2 illustrates adder cells and the associated pointer chain and carry chain.

For this simple case, location "i" is defined as the location where the bits of the addends are not both zero. Hence, it is the approximate location of the MSB, and it is the location where the pointer, $F_n$ is stopped; "F" stands for "finger propagation". Location i+1 is the next more significant location. The term that propagates the pointer is the "$U_n$" term; its value for these addends is also given above. By the definition set above, $U_n$ will be "1" to the left of the i location, "0" at the i location, and "don't care" (X) to the right of the i location. FIG. 2 illustrates how the $U_n$ and $F_n$ terms are utilized in a typical circuit implementation. The "pointer chain" is a serial string of precharged gates having the $U_n$ terms as their inputs. Their inputs, to the left of each associated cell, are the $f_n$ terms, and their outputs, to the right of each associated cell, are the $F_{n-1}$ terms.

To accomplish the adder function, FIG. 2 shows a multiplicity of adder cells (201 . . . 204), which receive the addend digits ($A_0B_0$ . . . $A_nB_n$ . . . $A_NB_N$). Each adder cell provides for a carry-out signal ($C_0$ . . . $C_n$ . . . $C_N$) to be supplied to the carry chain. Each successive cell is provided with a carry-input for receiving a carry signal from the next lower significant digit cell. The carry chain may be precharged high by clocked transistors (not shown) in a similar manner as the pointer chain, discussed below. The right end of the chain (at $C_0$) may then be grounded, to cause a low voltage to propagate along the carry chain. Alternately, a desired carry-in signal may be supplied to the $C_0$ end of the chain. A suitable adder cell, which provides for rapid propagation of the carry signal, is described in U.S. Pat. No. 4,357,675, coassigned with the present invention. If desired, the speed of carry propagation can be further increased by the use of the carry-bypass technique; see O. Spaniol, *Computer Arithmetic*, pp. 56–67, John Wiley, (1981).

To implement the FLSD function, with each adder cell there is associated a FLSD cell that provides a $U_n$ output. The logic of the FLSD cell, described further below, provides that $U_n$ is "1" to the left (i.e., toward the more significant digits) of the approximate location of the MSB, and "0" at the approximate location. Each of the $U_n$ outputs are supplied to the gates of field effect transistors (FETs) connected in the "pointer chain". The sources and drains of these transistors (211 . . . 214) are initially precharged to a high voltage level through the precharge transistors (221 . . . 224) that are clocked by signal PCLK. Since the $U_n$ signal is "1" (high voltage level) for all cells to the left of the approximate location of the MSB (i.e., for n>i), the pointer chain will be discharged to a "0" (ground voltage level) to that point, and remain at "1" (high voltage level) to the right of that location (i.e., for n<i). Note that the $F_n$ term is defined for the source/drain electrode of the FET to the left (more significant digit) side of each cell. Hence, $F_n$ will be a "0" for each cell where $U_n$ is a "1", for n>i, as well as for the "$i^{th}$" cell, where $U_n$ is first "0". Since the FET for the "$i^{th}$" cell in the pointer chain is turned off by the low $U_i$ signal applied to its gate, all of the $F_n$ terms to the right of that cell remain in the "1"

state (i.e., the pointer chain remains charged to a high voltage level), regardless of the values of $U_n$ for those cells. Hence, $U_n = X$ (don't care) for those cells ($n < i$).

The output of the FLSD approximation is $N+1$ bits, where exactly one of those bits is "1", in order to select the $i^{th}$ position from the $N+1$ possible locations. The output, $L_n$, is the logical (NOR) combination of the $F_n$ and $U_n$ terms. More specifically $L_n$ is "0" to the left and right of the approximate MSB location (i), and it is a "1" at the "i" location. Thus, $$\overline{L_n = F_n + U_n}, \tag{1}$$

where $+$ is a logical "OR" operation, as illustrated below:

TABLE 2

| bit location | N | | | i+1 | i | | | 0 |
|---|---|---|---|---|---|---|---|---|
| A | 0 | 0 | 0 | 0 | 1 | 0 | 1 | 1 |
| B | 0 | 0 | 0 | 1 | 0 | 0 | 0 | 0 |
| SUM | 0 | 0 | 0 | 1 | 1 | 0 | 1 | 1 |
| MSB | | | | • | | | | |
| $F_n$ | 0 | 0 | 0 | 0 | 1 | 1 | 1 | 1 |
| $U_n$ | 1 | 1 | 1 | 0 | X | X | X | X |
| $L_n$ | 0 | 0 | 0 | 1 | 0 | 0 | 0 | 0 |

While the foregoing has illustrated the present technique for a simple case, there are complications that still have to be considered; one of them is the carry in to the "i" location. The table below presents the condition where the carry in to location "i" is a "i", simply by changing the "i−1" value in operand "B" from "0" to "1".

TABLE 3

| bit location | N | | | i+1 | i | i−1 | | 0 |
|---|---|---|---|---|---|---|---|---|
| A | 0 | 0 | 0 | 0 | 1 | 0 | 1 | 1 |
| B | 0 | 0 | 0 | 1 | 1 | 0 | 0 | 0 |
| SUM | 0 | 0 | 1 | 0 | 0 | 0 | 1 | 1 |
| MSB | | | • | | | | | |
| $F_n$ | 0 | 0 | 0 | 0 | 1 | 1 | 1 | 1 |
| $U_n$ | 1 | 1 | 1 | 0 | X | X | X | X |
| $L_n$ | 0 | 0 | 0 | 1 | 0 | 0 | 0 | 0 |

Notice that the $F_n$, $U_n$, and $L_n$ values didn't change as compared to the previous case, but the MSB is at the "i+1" position. This situation brings another parameter into the FLSD function, the carry in to location "i". The condition set above suggests that we have to wait for the carry into location "i" in order to determine the final position of the MSB. However, this would in effect defect the original purpose, parallel generation of the sum and the MSB location. The present invention in one embodiment overcomes this hurdle as follows: Since the locations of the $U_i$, $F_i$, and $L_i$ terms do not alter as a result of the carry in, the $U_n$ terms are first generated, and the pointer $F_n$ propagated, according to the above-noted conditions. Thereafter, the final position of the MSB is arbitrated. That is, the $L_i$ term will approximately locate the MSB, and will be incorrect to no more than one bit position in one direction. The final determination as to whether the MSB is at the $i^{th}$ position (i.e., where $L_n = 1$), or the next more significant bit position (i+1), is referred to as "arbitration". In the present technique, the $U_n$, $F_n$, and $L_n$ terms are generated while the addends A, B are being added. The arbitration is then handled later, when the carry is available. The net result is a saving of the time required for the pointer propagation, which is the main component in the time needed to generate the FLSD result. One implementation of the arbitration is referred to herein as "post-shift", and will be described below.

Another expected complication stems from the fact that the addends may be either positive or negative. This implies that the result of the addition can be either positive or negative. This in turn affects the decision of which is the most significant digit; i.e., is it the first "1" or the first "0"? We firstly consider the case wherein a negative number is represented in 2's complement form, which is obtained by inverting each bit of the positive form of the number, and then adding 1 thereto.

The following statement is true for either a positive or a negative number: the most significant bit in a number is distinguished from others by the fact that it is different from its sign bit, and it is different from each of the bits to its left.

In a positive number the sign bit is "0" and the most significant bit is a "1".

In a negative number the sign bit is "1" and the most significant bit is a "0".

There are four cases to consider, depending on the sign of the addends, in order to anticipate the position of the most significant bit of the sum. The table below displays these cases. The $\sim$ symbol means "NOT"; when used with a bracket, it means that the terms in the bracket do not both have the indicated value. Thus, a $$\sim \begin{vmatrix} 0 \\ 0 \end{vmatrix}$$

means that at least one of the terms is a "1". It points to the conditions under which we are to propagate the $F_n$ term.

TABLE 4

(1) $A_n = B_n = 0$ for $n > i$

| bit loc. | N | | | | i+1 | ~ | i | | |
|---|---|---|---|---|---|---|---|---|---|
| $A_n$ | 0 | 0 | 0 | 0 ... | 0 | | $\begin{vmatrix}0\\0\end{vmatrix}$ | X...X | |
| $B_n$ | 0 | 0 | 0 | 0 ... | 0 | | $\begin{vmatrix}0\\0\end{vmatrix}$ | X...X | |
| . | . | . . . | | . | | . | | |
| . | . | . . . | | . | | . | | |
| . | . | . . . | | . | | . | | |
| $U_n$ | 1 | 1 | 1 | 1 ... | 1 | | 0 | X...X | |

(2) $A_n = B_n = 1$ for $n > i$

| bit loc. | N | | | | i+1 | ~ | i | | |
|---|---|---|---|---|---|---|---|---|---|
| $A_n$ | 1 | 1 | 1 | 1 ... | 1 | | $\begin{vmatrix}1\\1\end{vmatrix}$ | X...X | |
| $B_n$ | 1 | 1 | 1 | 1 ... | 1 | | $\begin{vmatrix}1\\1\end{vmatrix}$ | X...X | |
| . | . | . . . | | . | | . | | |
| . | . | . . . | | . | | . | | |
| . | . | . . . | | . | | . | | |
| $U_n$ | 1 | 1 | 1 | 1 ... | 1 | | 0 | X...X | |

(3) Skip $A_n \sim B_n$, revert to case (1) when $A_n = B_n = 1$

-continued

| bit loc. | N | | | | | i+1 | | i | | | | |
|---|---|---|---|---|---|---|---|---|---|---|---|---|
| $A_n$ | 1 | 0 | 0 | 1 | ... | 0 | 1 | 0...0 | ~ | 0 | | X...X |
| $B_n$ | 0 | 1 | 1 | 0 | ... | 1 | 1 | 0...0 | | 0 | | X...X |
| . | . | . | . | . | | . | | . | | | | |
| . | . | . | . | . | | . | | . | | | | |
| . | . | . | . | . | | . | | . | | | | |
| $U_n$ | 1 | 1 | 1 | 1 | ... | 1 | 1 | 1...1 | | 0 | | X...X |

(4) Skip $A_n \sim B_n$, revert to case (2) when $A_n = B_n = 0$

| bit loc. | N | | | | | i+1 | | i | | | | |
|---|---|---|---|---|---|---|---|---|---|---|---|---|
| $A_n$ | 0 | 1 | 1 | 0 | ... | 1 | 0 | 1...1 | ~ | 1 | | X...X |
| $B_n$ | 1 | 0 | 0 | 1 | ... | 0 | 0 | 1...1 | | 1 | | X...X |
| . | . | . | . | . | | . | | . | | | | |
| . | . | . | . | . | | . | | . | | | | |
| . | . | . | . | . | | . | | . | | | | |
| $U_n$ | 1 | 1 | 1 | 1 | ... | 1 | 1 | 1...1 | | 0 | | X...X |

The interpretation of this representation is as follows:

In case 1 we will stop at the location in which either A or B equals 1. In case 2 we will stop at the location in which either A or B equals 0. In cases 3 and 4 we will skip all the positions in which $A \sim B$ and then the condition set in case 1 and case 2 determines the location of $U_i = 0$. Then, if $U_i = 0$ and $U_j = 1$ for all $j > i$, the MSB of the sum is at location i or (i+1). Note also in case 3 and 4 that the term in the bracket may follow immediately to the right of the leftmost $A_n = B_n = 1$, or $A_n = B_n = 0$, position, respectively. That is, there may be no intervening terms therebetween.

To express the above truth tables logically, $U_n$ can be logically expressed as a function of five parameters:

$$U(n) = f[A_n, B_n, A_{n+1}, P_{n+1}, P_{n+2}]$$

where:
- $A_n$ is the bit of operand A at location "n".
- $B_n$ is the bit of operand B at location "n".
- $A_{n+1}$ is the bit of operand A at location (n+1).
- $P_{n+1}$ is the carry propagate at location (n+1), wherein $P_{n+1} = A_{n+1} \oplus B_{n+1}$
- $P_{n+2}$ is the carry propagate at location (n+2), wherein $P_{n+2} = A_{n+2} \oplus B_{n+2}$ (Note that in general, a propagate signal ($P_n$) is generated when the binary digits at a given cell are not equal, i.e., $A_n \neq B_n$.)

Figure 3:
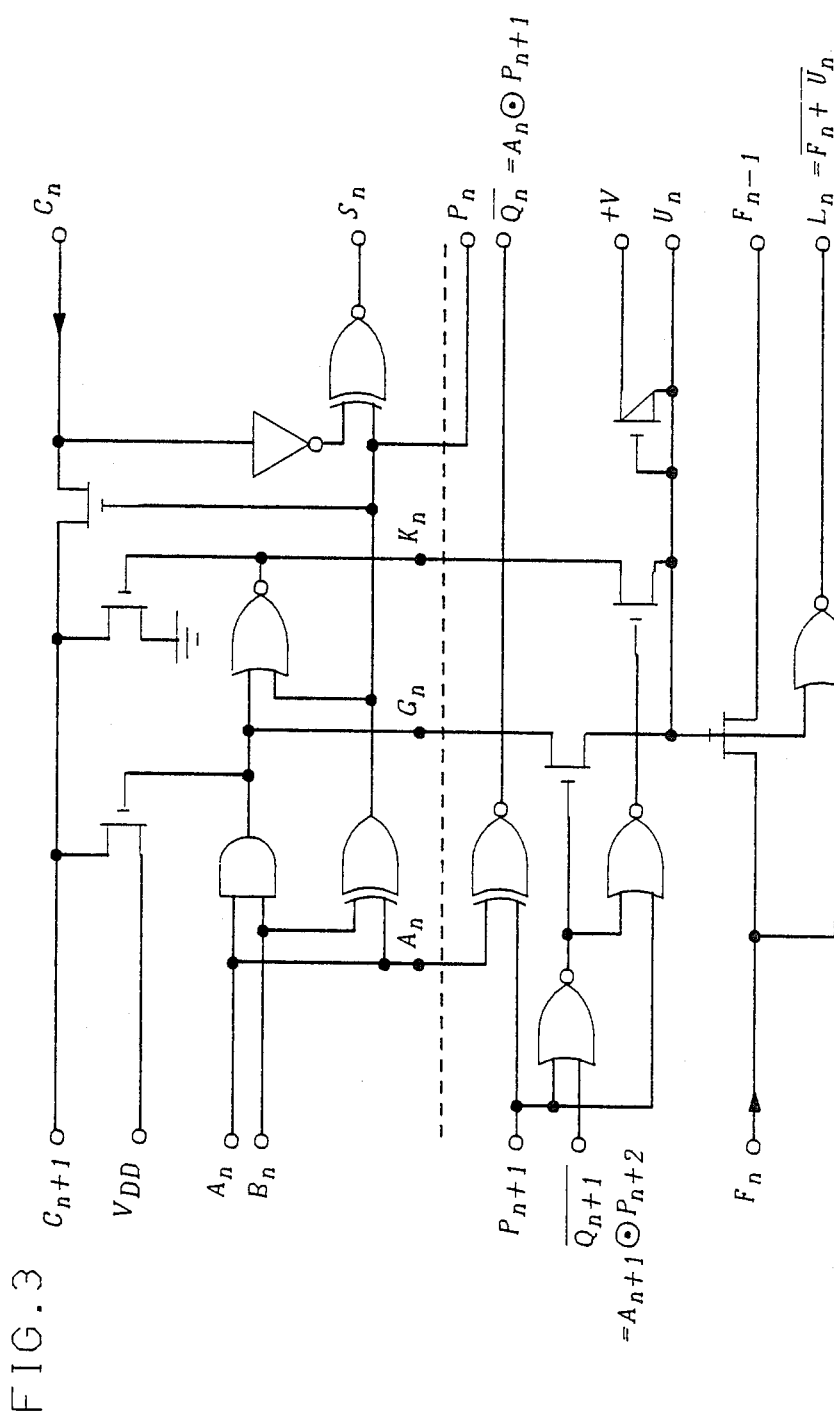
FIG. 3 illustrates a typical adder cell and FLSD circuitry.

All the terms are readily available in the adder cell shown in FIG. 3. Therefore, the only new provision for the FLSD cell is to add routing paths in the adder cell. From a circuit design point of view, to accommodate the new function the drivers of the $P_n$ and the $A_n$ terms are increased in size to handle this increased capacitance without degrading the operation of the adder cell.

The function $U_n$ is given by the following logic equation, where $\oplus$ is the "exclusive or" logical operation and $\ominus$ is the "exclusive nor" logical operation.

$$U_n = P_{n+1} + A_n \cdot B_n [A_{n+1} \oplus P_{n+2}] + \overline{A_n} \cdot \overline{B_n} [A_{n+1} \ominus P_{n+2}] \quad (2)$$

The interpretation of (2) is as follows:

The third term in (2) covers case #1: $U_n$ will propagate $F_n$ (i.e., $U_n = 1$) when A and B are both "0" and $A_{n+1}$ exclusive nor with $P_{n+2}$ is "1".

The second term in (2) covers case #2: $U_n$ will propagate $F_n$ when A and B are "1" and $A_{n+1}$ exclusive or with $P_{n+2}$ is "1".

The first, second and third terms cover case 3 and 4: $U_n$ will propagate $F_n$ if $P_{n+1}$ is "1" or if the second and third term are "1". The term $(A_n \cdot B_n)$ is referred to as the "generate carry", and is alternately represented as $G_n$ therein; the term $(\overline{A_n} \cdot \overline{B_n})$ is referred to as the "kill carry", and is alternately represented as $K_n$ herein. An alternate form of (2) is given by:

$$U_n = P_{n+1} + G_n(A_{n+1} \oplus P_{n+2}) + K_n(A_{n+1} \ominus P_{n+2}). \quad (3)$$

This form is also convenient for determining the MSB of the difference of two numbers (e.g., A−B), as discussed below for the case of the sign-magnitude number representation. A logic circuit implementing the $U_n$ function thus defined is given in FIG. 3.

FIG. 3 shows both the adder cell and the FLSD cell with their connections. (Note that in contrast with FIG. 2, the adder portion is shown above the dotted line, and the FLSD portion below it.) The $G_n$ term represents the $A_n \cdot B_n$ from (2); it is the carry generate of the adder cell. The $K_n$ term represents the $(\overline{A_n} \cdot \overline{B_n})$ from (2), it is the carry kill from the adder cell. The intermediate terms $\overline{Q_n}$ and $\overline{Q_{n+1}}$ are defined in FIG. 3, they were generated in this form to ease actual circuit implementation. The output from the FLSD operation is in the form of 1 of N+1, which means that only the $i^{th}$ bit position is "1" and the rest are "0". This condition is obtained by using a NOR gate to implement the $L_n$ term (FIG. 3), where the inputs are $U_n$ and $F_n$; see (1). This assures that the only position that is "1" is the position where both $U_n$ and $F_n$ are "0". The scheme detects very fast, the approximate position in which the MSB is located. It is either the "i" or the "i+1" position. The search for the MSB is principally the time that it takes to ripple the pointer, $F_n$ term, through the FLSD chain. The construction of the FLSD chain resembles, as FIG. 2 suggests, very much the carry chain adder. With the knowledge of the approximate location, we can proceed to the next step, the encoding, while determining at the same time the final (i.e., exact) location of the MSB.

Figure 4:
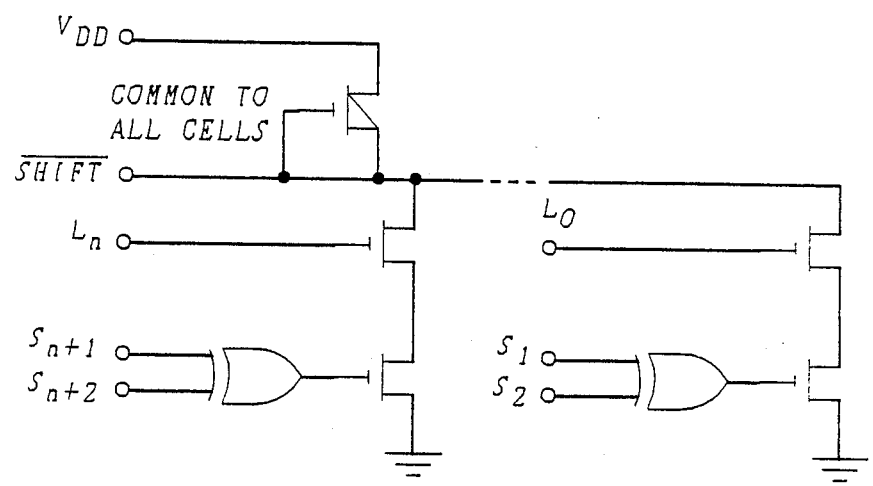
FIGS. 4 and 5 illustrate circuitry for arbitrating a final shift of the sum.
Figure 5:
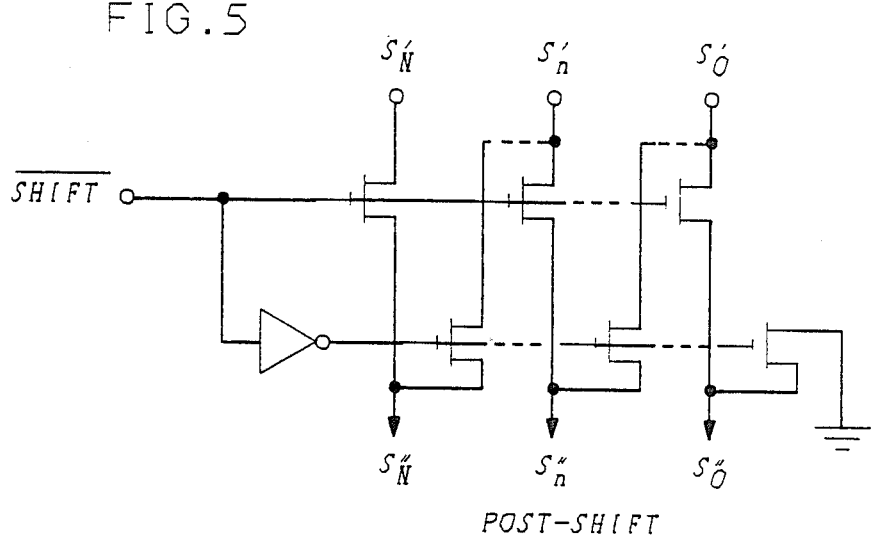

The "post-shift" block eliminates the need for the knowledge of the exact location of the significant digit at the time of the pointer ripple. This is because the pointer $U_i$ is at most one bit to the right of the MSB, which may be at location i or location i+1. Hence, the mantissa may be post-shifted by one, and the exponent is increased by one, by providing a carry input into the least significant adder cell of the exponent adjust. Notice that the control to the post-shift, defined here as $\overline{SHIFT}$ signal, is derived from the FLSD cell, see FIG. 4. Each cell, if its "$L_n$" term is a logical "1", affects the post-shift depending on the sum of the "n+1" location and the sign bit of the number, which is the $S_{n+2}$ term. This new control $\overline{SHIFT}$ is used to post-shift the mantissa and to increment the exponent. This is accomplished by a 1-bit shifter controlled by $\overline{SHIFT}$. A one bit shifter implementation is shown in FIG. 5, with other types being possible. When $\overline{SHIFT} = 1$, the sum bits remain unshifted; when $\overline{SHIFT} = 0$, each bit in the sum is shifted left one location. The arbitration of the exact position of the MSB can alternately be accomplished in a "pre-shift" operation. That is, the 1-bit shifter can be placed before the approximate shift function. These new provisions eliminate the waste of time during the actual search for the significant digit, by relocating the decision into the non-critical time when the information that is needed for the decision, the sign bit and the carry in into the i position, is available.

The foregoing embodiment performed the FLSD operation using a two-step procedure, wherein an approximate, and then final, location were determined. In another embodiment of the present technique, the exact position of the MSB is determined, thus eliminating the need for a final arbitration. In some cases, one or the other of these embodiments allows a reduction in circuit complexity. Utilizing the terminology defined above, the $L_n$ function is then given as (where $L_n=1$ is now the exact location of the MSB):

$$L_n = \overline{F_n}[(U_n\overline{P_n}(A_n \oplus P_{n+1}) \oplus C_n) + \overline{U_n}P_n((A_{n+1} \oplus P_{n+2}) \oplus \overline{C_{n+1}})] \quad (4)$$

Note that $P_n = A_n \oplus B_n$, and that $C_{n+1}$ is the carry-in to the n+1 cell; that is, it is the carry-out signal of the n cell; see FIG. 3. However, the formula is also correct if $C_n$ is used instead of $C_{n+1}$. The other terms are as defined above.

Note that while the sum is typically normalized following the MSB location, other operations are possible. For example, the present technique may be used to determine the MSB's for two or more sums, in order to determine the one having the largest magnitude, without first normalizing the sums. A normalization operation may then be performed at a later time, if desired. Other logical operations can be performed following application of the present technique prior to, or in lieu of, normalization. Note then an exception operation (FIG. 1) can provide for handling overflow or underflow conditions, in which case the mantissa and exponent are typically set to pre-determined values. Also, if equal operands are subtracted, producing a zero result, the exception circuit can be used to set the output to zero. This resolves a possible ambiguity for floating point numbers, where zero operands are not normally present.

The foregoing has illustrated the present technique for numbers represented in 2's complement form, so that negative numbers can be added, in lieu of performing a subtract operation. However, the present technique can alternately be implemented for numbers represented in "sign-magnitude" form. That is, a negative number is then conventionally indicated by a "1" in the most significant location, but the mantissa is otherwise unchanged; i.e., not inverted. Addition in the sign-magnitude format can be readily accomplished if both addends have the same sign (i.e., both positive or both negative). Then, the mantissas are added, and assigned the common sign. The present technique can readily determine the MSB of the sum, by applying the above technique for the case of both A and B positive (e.g., tables 1-3). If one of the addends (e.g., A) is positive, and the other (e.g., B) negative, then a subtraction is performed in the sign-magnitude system (e.g., A−B). The present technique can also determine the MSB of the result of the subtraction (i.e., of the difference) of A and B. This is accomplished by re-defining the P (propagate carry), G (generate carry), and K (kill carry) to become propagate borrow, generate borrow, and kill borrow, respectively. This is illustrated by the following table:

TABLE 5

|     | B | 0 | 1 | 0 | 1 |
|-----|---|---|---|---|---|
|     | A | 1 | 0 | 0 | 1 |
| Add | (A+B) | P | P | K | G |

| Sub | (B−A) | G | K | P | P |

For addition (A+B),

G = generate carry; i.e., $A_n = B_n = 1$
K = kill carry; i.e., $A_n = B_n = 0$
P = propagate carry; i.e., $A_n \neq B_n$ For subtraction (B−A), G = generate borrow; i.e., $B_n = 0, A_n = 1$
K = kill borrow; i.e., $B_n = 1, A_n = 0$
P = propagate borrow; i.e., $A_n = B_n$ Then, the above formulas (1), (2) and (3) apply for determining the MSB of the difference. Also, the shift function (see FIG. 4) is the same, with difference digits replacing sum digits. In addition, the exact formula (4) applies by also replacing the C (carry-in) term with an analogous borrow-in term. As used herein, the term "combining" refers to adding or subtracting two numbers, and "combiner cells" refer to the adder or subtracter cells that operate on the digits of the numbers. The term "result" refers to the sum or difference obtained thereby. The term "operand" refers to an addend, minuend, or subtrahend, as appropriate.

The foregoing description has been directed largely to an implementation of the present invention utilizing a digit combiner cell that allows a carry (or borrow) input signal to rapidly pass through the cell unaltered under certain conditions. This is referred to herein as "propagation". The cell also produces "generate" and "kill" signals as appropriate. However, the present invention may also be practiced using other types of combiner cells that do not produce a propagate signal per se. Such other cells include ripple carry adder cells, and carry look-ahead adder cells. These other cells utilize logic gates to generate the carry (or borrow) signal as appropriate, without the use of the propagate function.

What is claimed is:

1. A circuit for combining a first operand (A) and a second operand (B) each comprising a plurality of digits, wherein said circuit comprises a plurality of combiner cells for combining the digits of said first operand to the digits of second operand in order to obtain a result (S) having a plurality of digits arrayed from most significant to least significant, CHARACTERIZED IN THAT
said circuit further comprises means coupled to said combiner cells for determining the approximate location of the most significant digit of said result to no more than 1 digit position inaccuracy by examining during said combining the digits of said first and second operands.

2. The circuit of claim 1 further comprising normalization means coupled to receive the result from said combiner cells for normalizing said result.

3. The circuit of claim 1 further comprising means coupled to said combiner cells for determining the exact location of said most significant digit when said result is available.

4. The circuit of claim 1 wherein a given combiner cell comprises means for producing a propagate signal ($P_n$) that is coupled to the next less significant digit combiner cell.

5. The circuit of claim 4 wherein said means determines said approximate location by determining a function $U_n$, where
$$U_n = P_{n+1} + A_n \cdot B_n(A_{n+1} \oplus P_{n+2}) + \overline{A_n} \cdot \overline{B_n}(A_{n+1} \ominus P_{n+2})$$

where $A_n$ and $A_{n+1}$ are the binary digits of operand A in digit positions n and n+1, respectively; $B_n$ is the binary digit of operand B in digit position n, and $P_{n+1}$, $P_{n+2}$ are the propagate signals generated by the combiner cells for digit positions n+1, n+2, respectively.

6. The circuit of claim 4 wherein said combiner cells are adder cells, and said propagate signal when present allows a carry signal to propagate through a given cell.

7. The circuit of claim 4 wherein said combiner cells are subtracter cells, and said propagate signal when present allows a borrow signal to propagate through a given cell.

* * * * *